United States Patent [19]
Alberti

[11] 3,918,825
[45] Nov. 11, 1975

[54] MULTIPLE WOODWORKING MACHINE AND METHOD

[76] Inventor: Luigi Alberti, c/o Alberti Vittorio S.p.A., Via Cavour, 75, 20063 Cernusco S.N., Milan, Italy

[22] Filed: May 14, 1973

[21] Appl. No.: 360,357

[30] Foreign Application Priority Data
May 20, 1972  Italy ................................. 24627/72

[52] U.S. Cl. .................. 408/43; 29/563; 83/268; 83/467; 144/3 E; 408/70
[51] Int. Cl.² ........................................ B23B 39/18
[58] Field of Search ............. 408/43, 44, 69, 70, 50, 408/4, 53; 29/33 P, 563; 83/268, 269, 391, 419, 467, 468, 516, 517; 144/3 E

[56] References Cited
UNITED STATES PATENTS
2,238,921   4/1941   Waldsmith .......................... 29/33 P
3,543,392   1/1970   Perry et al. ........................ 408/70 X Primary Examiner—Harrison L. Hinson
Assistant Examiner—Z. R. Bilinsky
Attorney, Agent, or Firm—Michael S. Striker

[57] ABSTRACT

The disclosure describes a multiple drilling machine for simultaneously drilling bores into at least two wooden boards sequentially fed along a single transfer line, said machine comprising at least an upstream and a downstream drilling unit, each capable of processing a board, arranged so that individual boards are carried and set in either unit for simultaneous progressing thereof at an upstream and respectively at a downstream station along said line, the disclosure describing also the manner for operating said multiple machine.

5 Claims, 3 Drawing Figures

MULTIPLE WOODWORKING MACHINE AND METHOD

BACKGROUND OF THE INVENTION

*a*. The Field of the Invention

This invention is concerned with the art of mechanical woodworking and more particularly with the drilling of bores into wooden boards, planks and panels, in mass production of wooden components for example for the manufacture of pieces of furniture, still more particularly the invention is concerned with a machine adapted for forming part of a line of station-type machine tools designed to provide completely machined planar components, preparatory to assembling.

*b*. The Prior Art

This art is a well worked one and no extensive comments thereabout is believed to be necessary. For providing a fully machined board, designed to be coplanarly or angularly secured to other ones, by means of suitably located pegs, a plurality of bores are to be drilled in well predetermined locations of the board. Such bores are simultaneously provided by suitable drilling machines including conveyor means for progressing the board in a given working station, stop and registering means for precise positioning of the board in such station, presser means which secure the board in such station, and a plurality of drilling tools controlledly displaced and driven for making the desired bores in the board while the same is stationary and secured in said station; when the drilling tools have completed the bores and then have been disengaged from the board, the presser means are also disengaged from the board and the conveyor means are activated again for deliverying the thus processed board from the machine.

This important drilling operation leads however to certain problems concerned with the efficiency and the rate of production. A line of station-type machine tools for machining wooden boards or like planar components includes a number of machines, such as sawing, planing, edge trimming, grooving machines and so on, which can very fastly operate and, more specifically, which can machine the material while being progressed along. The drilling machine is generally located in the line as the last machine thereof. As above indicated, the drilling machine cannot operate on the progressing material, but it requires that the board would be held stationary during the steps in which the drilling tools are engaged into the board. The rate of production is therefore determined, in the entire line, by the time required for the complete performance of such steps, while the other machine tools could well provide a greatly faster production.

It is therefore the principal object of this invention to provide a new multiple drilling machine and a new method for making use thereof, which yield to a substantially increasing of the production rate.

BRIEF SUMMARY OF THE INVENTION

Essentially, according to the invention, at least two drilling machines are provided and arranged in the flow of the material to act as an upstream and respectively a downstream machine, which define an upstream and respectively a downstream working station. Conveyor means are provided for sequentially progressing wooden boards into and through the upstream and the downstream machine. Stop and register means are provided for positioning a first wooden board which had been delivered through the upstream machine in the downstream station in the downstream machine, and a second board in the upstream station in the upstream machine. All the machines are then conventionally and simultaneously operated for simultaneously drilling both first and second board in said downstream and in said upstream stations. As the drilling step has been performed and the drilling tools of all machines had been disengaged from all drilled boards, the conveyor means are again activated for sequentially deliverying all boards off the downstream machine, the board which has been drilled in the upstream station being delivered by passing same through the downstream machine.

It is therefore evident that a multiple arrangement as above and the described manner for taking advantage thereof will double the production rate of the line, because two boards at least are simultaneously worked. It is further evident that more than two drilling machines might be arranged in line to provide more than two working stations, if desired for further improving the production rate, while one line or flow of boards is maintained.

These and other objects and advantages of the invention will be made apparent from the following detailed description of an embodiment of the invention, taken by way of example only, reference being made to the accompanying drawings, wherein the structural details and various devices of the machines have been omitted or diagrammatically illustrated, as individually appertaining to the current knowledge of the art to which this invention appertains.

THE VIEWS OF THE DRAWINGS

DETAILED DRSCRIPTION OF THE PREFERRED EMBODIMENT

Figure 1:
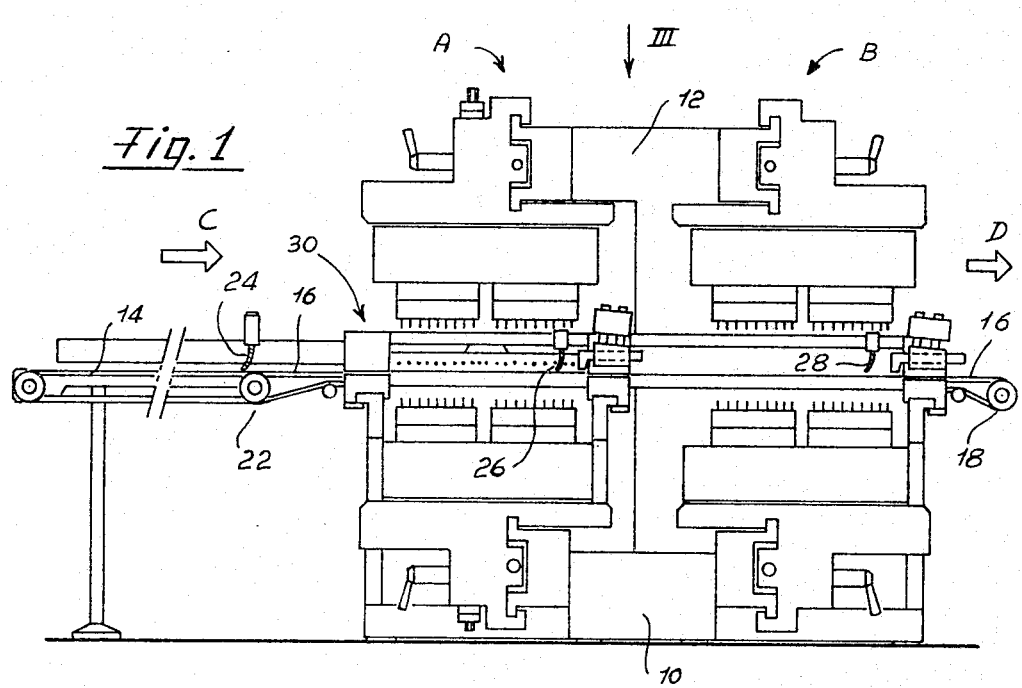
FIG. 1 is a diagrammatical longitudinal sectional view of the multiple machine, taken in the plane indicated at I—I in FIG. 3.
Figure 2:
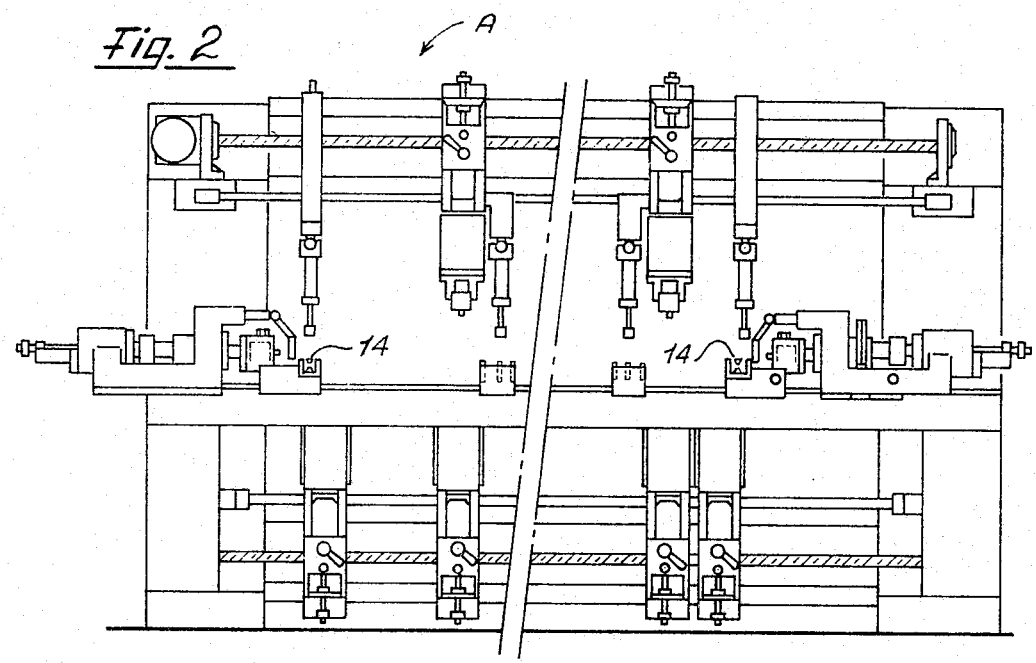
FIG. 2 is an elevational view of the machine, seen from the direction and from the plane indicated at II—II in same FIG. 3.
Figure 3:
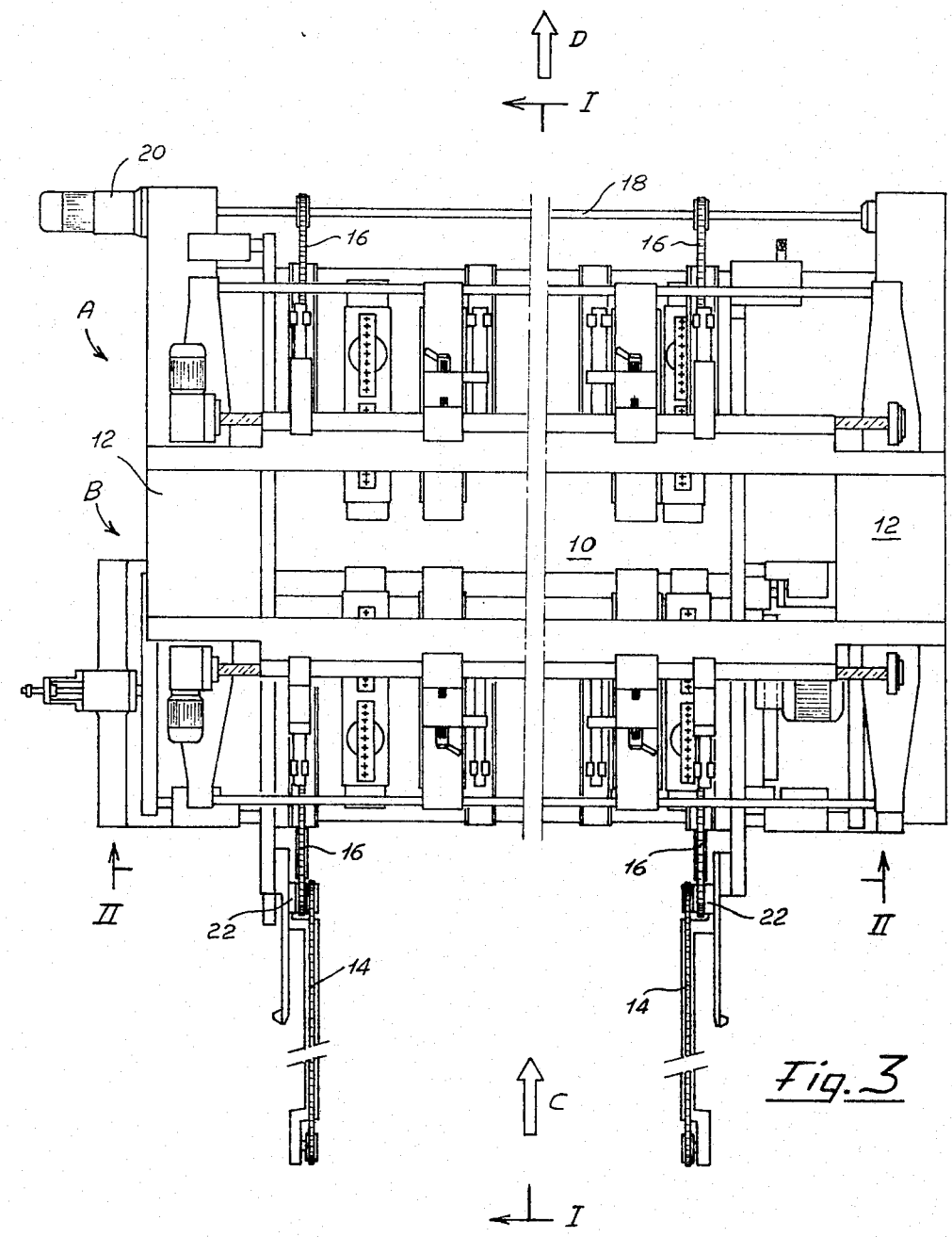
FIG. 3 is a diagrammatical view from above of the machine, seen in the direction indicated at —III— in FIG. 1.

Referring now to the drawings, wherein like reference numerals and letters refer to like parts and elements throughout the several FIGURES: when considered in its broadest aspect, the invention comprises the combination and the arrangement "in line" of two generally conventional drilling machines indicated at A and B. Such machines are preferably but not critically equal, and different machines can be provided and arranged when concurrent machining of different boards is desired.

The machines A and B are suitably positioned and secured to each other, by means of suitable frame components, such as generally indicated at 10 and 12, to provide aligned, co-planar and indexed working stations through which the boards can be successively transferred, the supply direction being indicated at C and the delivery direction at D. Therefore, assuming that the flow of the boards to be machined is running from C to D through the machines A and B, the machine A will be considered the upstream one and the machine B the downstream one. Each one of such machines A and B is, as individually considered from the point of view of the drilling work, quite conventional. Therefore, each one of such machines A and B comprises stop and register means for positioning a board in a defined working station thereinto, pressure means for securing the positioned board, and selectively positionable motor driven drilling tools (diagrammatically indicated) for simultaneously drilling bores and holes in the such positioned and secured board. Such machines define thus an upstream working station and a downstream working station.

In the arrangement of the invention, upstream of the upstream drilling machine A a supply transfer system is provided for sequentially feeding wooden boards to the multiple machine. Such transfer system might comprise conveyor belts 14, conventionally supported and driven. Co-planarly with and downstream of such supply system a transfer system, including other conveyor belts 16, is lengthwise arranged through both machines A and B, for controlledly transferring boards from the supply, through machine A and then machine B, to the delivery. The said conveyor belts 16 are driven by pulleys supported by a shaft 18, connected to a suitable motor 20, and rotatably supported at the downstream end of the assembly, the belts 16 being stretched between said pulleys at 18 and other pulleys 22 supported at the upstream or supply end of the multiple machine to form a horizontal upper conveying run therebetween. The conveyor belts 14 of the supply system can be driven by same belts 16 of the transfer system. The motor 20 can be deactivated during the drilling operation of the machines.

Along the path of the wooden boards as set on and conveyed by the said belts 14 and 16, a plurality of stop means is provided, each stop means corresponding, when individually considered, with the conventionally constructed and operated stop means designed for positioning a board in a working station, and then leaving the worked board free for further conveying to the delivery. Such stop means comprise, in said path in direction C-D, a first stop means 24 upstream and outside the upstream machine A, and defining a holding station at which a board can be maintained stationary until the machine is ready for receiving same; a second stop means 26 in the outlet portion of the upstream machine A, to define an upstream working station in said machine, and a third stop means 28 in the outlet portion of the downstream machine B to define a downstream station into said latter machine. Such stop means are conventionally constructed and actuated by also conventionally hydraulic or pneumatic or also electromagnetic actuators, adapted for displacing such means off the said path, when the board is to be further conveyed to the delivery, and repositioning such means in said path, when a successively conveyed board, from the supply, is to be stopped in the station (holding or working) defined by same means.

Suitable sensors (of any conventional type) are provided along said path for sensing the passage of individual boards therealong, said sensors being connected in a suitable electrically or fluidly operated control circuitry. This circuitry and the sensor means are not shown neither will be described as being easily conceivable by those skilled in the art, upon acknowledgement of the scope and of the manner in which the machine is to be operated, as follows. Such circuitry can be located at 30, for example, together with the necessary switch and control means. The said circuitry is generally of the type conventionally made use of for sequentially and phasedly controlling the progressing of workpieces along a station-type machine tool assembly, for preventing a work-piece to be transferred to any given station until another piece is being worked or anyway not disengaged from such station, and to clear the transfer in a station as soon as such station can receive a piece.

Assuming that no boards are present in any machine A and B, the stop means 24 and 26 are set to clear the transfer in direction C and the stop means 28 is set to stop a board in the downstream station in the downstream machine B. Assuming now that suitably spaced boards to be drilled are approaching the supply system on the conveyor belts 14, the first or leading board is cleared to pass over the said stop means 24 and 26 until abutment on the stop means 28, that is until it has attained the downstream working station. As a sensor means has sensed the passage of the said first board through the upstream machine A, the stop means 26 is set to stop the second or following board in the upstream station within the upstream machine A and, as soon as the said second board has cleared the stop means 24, this latter stop means also is set to stop any further incoming board in the holding station. Of course, the production station-type line is preferably arranged and operated for phasedly supplying boards in direction C so that no unnecessary holding of boards will occur upstream of the multiple machine.

When the sensor means have sensed that a first and a second board are suitably present and positioned in either the downstream and upstream stations in said machines B and respectively A, said machines are actuated for providing the conventional sequence of operations, such as actuation of the presser means, engagement of the drilling tools into the boards, return stroke of such drilling tools for clearing the wooden boards, and return stroke of the presser means for disengaging the drilled boards, as well known in the art. Upon completion of such sequence of operations, all stop means 24, 26 and 28 are set to clear the path and the first and second drilled boards are sequentially delivered off the multiple machine, in direction D, the second board, machined in the upstream machine A, being of course delivered by passing it through the downstream machine B; as soon as the sensor means have sensed that the said second boards has cleared the downstream machine B, the stop means 28 is set to stop the further conveyed board to be machined, and the above described cycle is then repeated for simultaneous machining of other two boards.

The advantage resulting from the arrangement of the new multiple machine is evident. Such machine doubles the rate of production because it can process two boards in the time in which a conventional drilling machine processes only one board. A further increment of the production can be provided by arranging three or even more machines along the line, and by causing such machines to receive and delivery boards therethrough, and to simultaneously processing all panels, as hereinbefore described.

The Inventor is aware that other arrangements has been devised and made use of for improving the production rate of a line of machine tools, wherein one (or more) machine tools operate on stationarily secured work-pieces and require a rather long time for completing the operation. Such prior arrangements comprise arranging side-by-side two or more machines and providing, in the transfer system upstream to such machines, switch means actuated for alternatively switching the work-pieces to be machined into one or into another of such machines. The new multiple machine and arrangement has been proved to be very advantageous also in comparison with the above prior arrangement. The costly and space occupying switching system is unnecessary; also the side-by-side arrangement of a plurality of machines requires space while, in a properly designed line of production, it is advantageous that all the machines of the line will be set along one line. In several actual embodiments of the invention, a twin multiple machine of the invention has been located in the place of a preceeding single one, thus doubling the production of the plant.

It is further evident that a multiple machine as above described can be easily provided and arranged by adapting an existing drilling machine and by complementing the same with one or more further ones and with suitable conveying, sensing and stop means to control the flow of the boards and arrange the same for simultaneous working thereof, as above described, such modifications and adaptations being comprised in the meaning and scope of this invention.

What is claimed is:

1. A woodworking system, particularly for drilling holes into wooden workpieces, comprising an upstream working station and a downstream working station arranged along a path; supply means supplying a series of workpieces for travel in said path; a single continuous conveyor positioned to receive said workpieces from said supply means in pairs which are each composed of a leading and a trailing workpieces, for conveying each of said workpieces sequentially through said upstream station and thereupon through said downstream station; first stop means for arresting the leading workpiece of each pair at said downstream station; second stop means for arresting the trailing workpiece of each pair at said upstream station in response to operation of said first stop means; means for simultaneously machining the workpieces located at said upstream and downstream stations, and for thereafter discharging these workpieces from said stations; blocking means for blocking the admission of additional workpieces from said supply means onto said conveyor in response to operation of said first and second stop means; means for deactivating said stop means and said blocking means upon termination of machining of said workpieces; and means for re-activating said first stop means in response to the exiting of the respective trailing workpiece of each pair from said downstream station.

2. A woodworking system as defined in claim 1; and further comprising a frame which connects said stations.

3. A woodworking system as defined in claim 1; and further comprising delivery means located downstream of said downstream station in said path for receiving said workpieces upon completion of the operation of said workpieces.

4. A woodworking system as defined in claim 1, wherein said supply means includes conveying means which feeds a series of workpieces downstream toward said blocking means.

5. A woodworking system as defined in claim 1, wherein said single conveyor linearly extends through said stations and defines a continuous horizontal run through the woodworking system.

* * * * *